Nov. 12, 1957 — L. T. WARD — 2,812,884
SPRAY DISPENSING VALVE
Filed Aug. 16, 1954 — 2 Sheets-Sheet 1
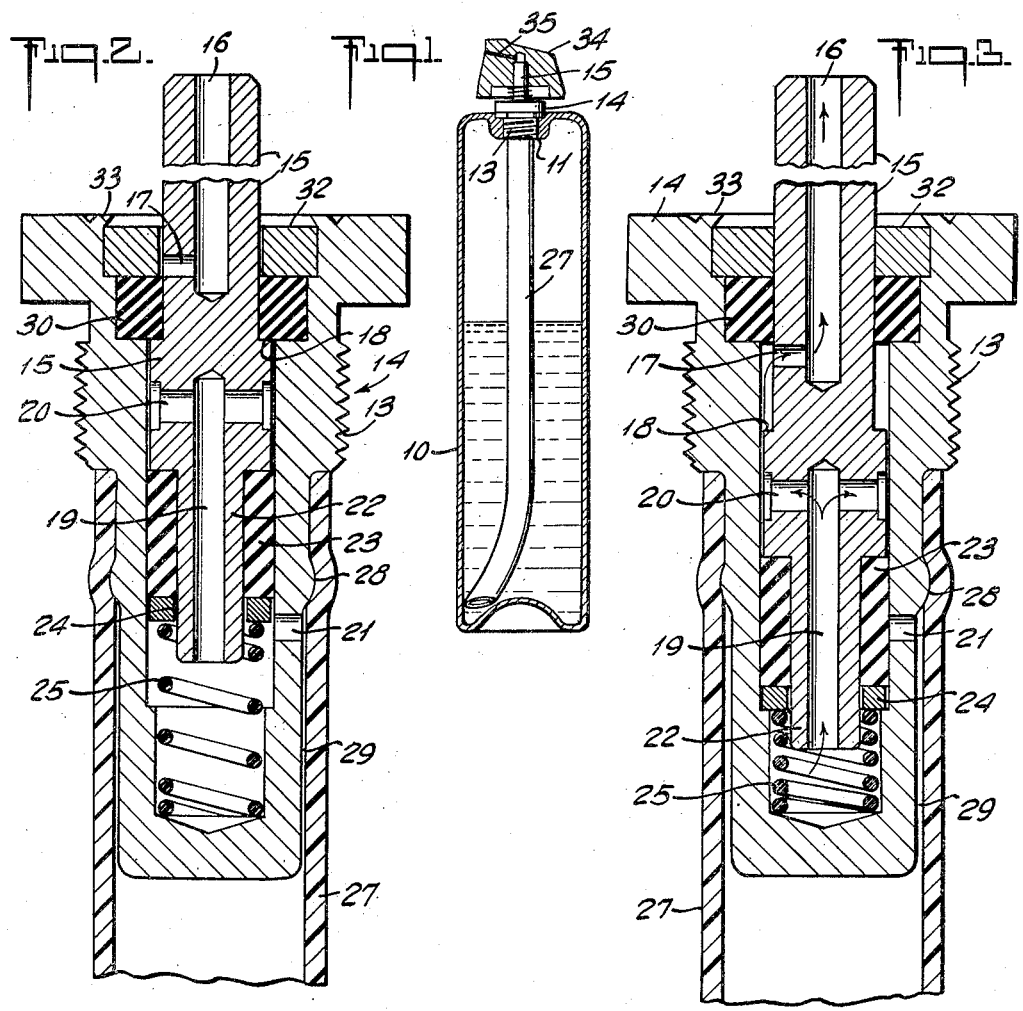
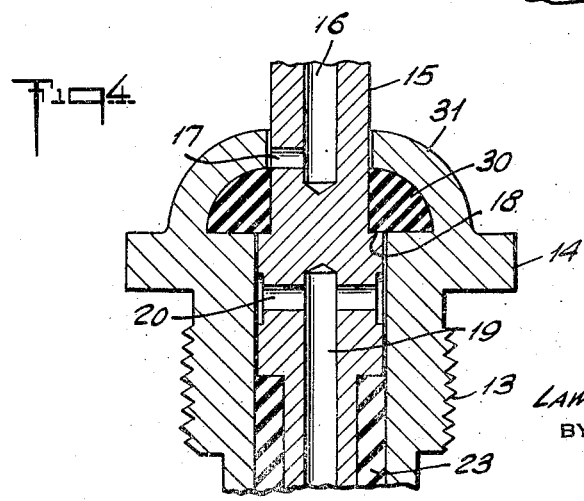
INVENTOR
LAWRENCE T. WARD
BY Frank Makara
ATTORNEY

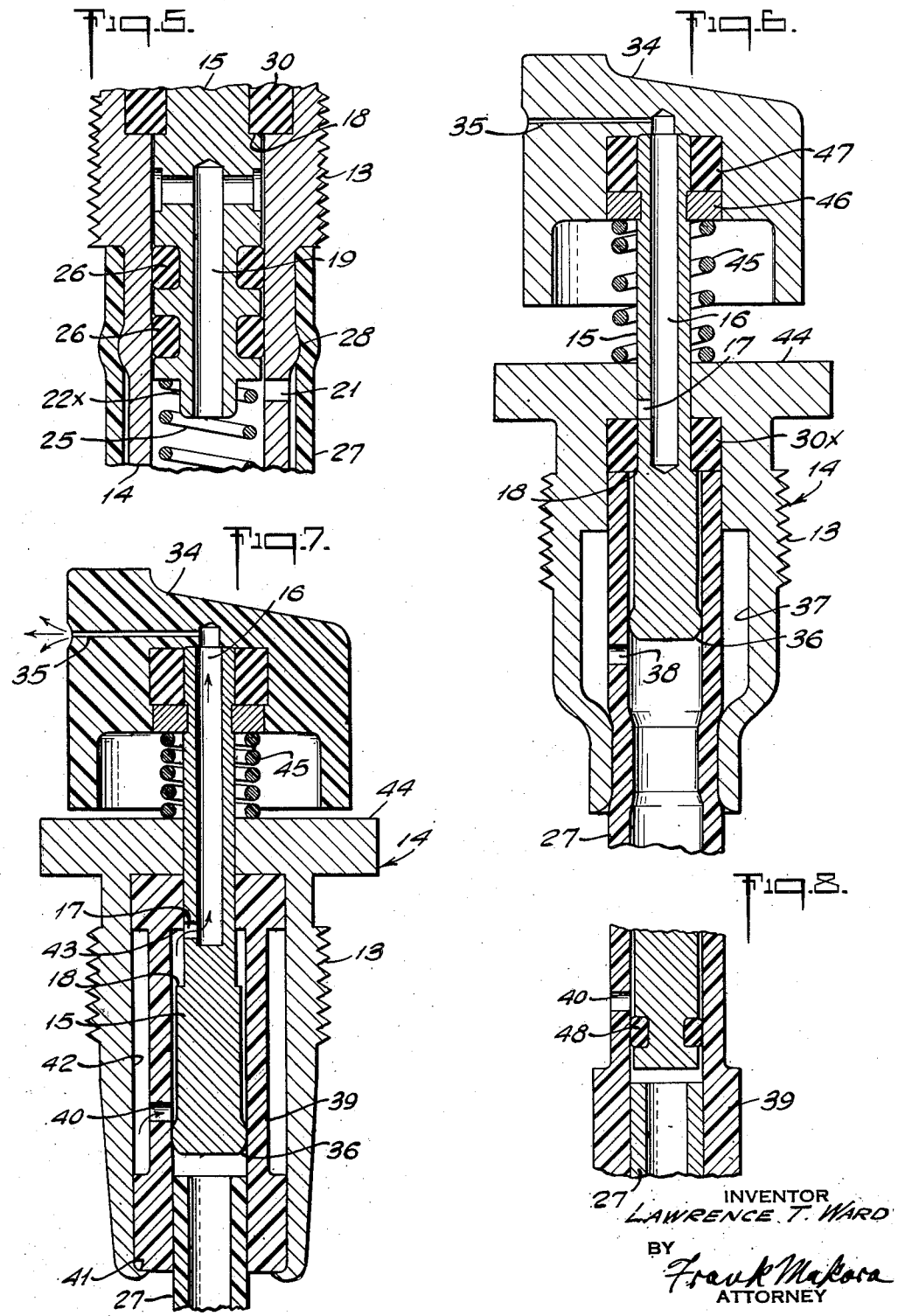

United States Patent Office 2,812,884
Patented Nov. 12, 1957

2,812,884

SPRAY DISPENSING VALVE

Lawrence T. Ward, Portland, Pa.

Application August 16, 1954, Serial No. 449,891

3 Claims. (Cl. 222—394)

This invention relates to a metering valve and more particularly to valve adapted to spray a fixed or metered quantity of low boiling fluid.

It is an object of this invention to provide a valve adapted to deliver a definite or metered amount of low boiling and easily vaporized liquid.

It is another object of this invention to provide a perfume sprayer adapted to deliver a fixed or metered amount of easily volatilized liquid.

It is a further object of this invention to provide a finger operated valve having an outlet opening adapted to emit a spray and having an inlet opening leading to a reservoir.

It is another object of this invention to provide a finger operated spray valve having a reservoir having an outlet opening adapted to open prior to closing an inlet opening leading to said reservoir.

It is another object of this invention to provide a spray valve adapted for small portable finger operated spray mechanisms, said valve having a reservoir having an inlet opening adapted to gradually close through a sufficiently long interval of time to permit complete evacuation of the reservoir contents.

It is another object of this invention to provide a small compact spray device adapted to sprayingly dispense a perfume dissolved in a low boiling solvent.

These and other objects of this invention will become apparent upon reading the following disclosure taken in conjunction with the drawing in which:

Fig. 1 is a longitudinal section view taken through a pressure resistant container and showing a syphon tube partly disposed in the liquid in the container and leading to the valve mechanism, and further showing a finger plate disposed over the outlet opening of the valve plunger.

Fig. 2 is a vertical section of a metered valve of this invention showing the syphon tube and top plunger section broken-away in part and further showing the valve reservoir in a charged condition.

Fig. 3 is a view similar to Fig. 2 but showing the valve reservoir in the discharging or spray forming condition.

Fig. 4 is a modification of Figs. 2 and 3 and showing an alternative manner of securing the valve plunger within the valve body.

Fig. 5 is a modification of Figs. 2 and 3 showing a plunger having a bottom section having a plurality of resilient cut-off rings disposed therein.

Fig. 6 is a vertical section of a modified metered valve showing a modified plunger co-acting with a modified reservoir defined by a modified valve body and showing the valve reservoir in a charged condition.

Fig. 7 is a view similar to Fig. 6 showing the identical plunger of Fig. 6 in a reservoir discharging or spray forming condition, but also showing modified means for defining the metered reservoir and, Fig. 8 is a view of the lower end of the plunger of Fig. 7 showing a resilient cut-off ring in lieu of a cut-off bulbous plunger terminus.

Referring to Fig. 1, a container 10 of conventional construction for retaining low boiling liquids under pressure, for example, Freon or other solvent-propellant having a small amount of perfume dissolved therein, is provided with a screw threaded well 11 adapted to receive the screw threads 13 of a valve body 14.

The valve body 14 is provided with a well in which there is relatively loosely fitted a rigid cylindrical plunger 15 having a top section in which there is a centrally disposed conduit 16 having a lateral conduit 17 communicating therewith at its inner end.

The top section of plunger 15 is of lesser diameter but integral with the bottom section of the plunger, forming a ledge 18 at the place of juncture.

In the modification of Figs. 2, 3 and 4, the bottom section of plunger 15 is provided with a centrally disposed tubular conduit 19 communicating with one or more lateral branch conduits 20. In the modification of Figs. 2, 3 and 4 the valve body 14 is provided with a well cavity of a diameter slightly larger than the diameter of the bottom section of the plunger 15, this loose fit being used for the passage of fluid from the reservoir to the atmosphere during spray formation.

The well cavity of the bottom section of valve body 14 functions as a storage reservoir of a measured amount of liquid to be dispersed as a spray, and is provided at a point in spaced relationship to the well bottom with an inlet orifice 21.

The bottom section of the plunger of the modification of Figs. 2, 3 and 4 may be provided with a portion 22 of diminished diameter adapted to receive a resilient rubber or plastic sealing ring 23. A metal or plastic ring 24 is disposed beneath the plastic sealing ring 23 and a spring 25 is disposed in the well cavity and in part about portion 22 of plunger 15.

The plunger 15 may be provided with an alternative bottom section as shown in Fig. 5. In this modification the plunger portion 22x is adapted to receive the spring 25. In the modification of Fig. 5 the bottom section of the plunger is provided with a plurality of circular grooves each of which contains a sealing ring 26.

Sealing rings 23 and sealing rings 26 are adapted to gradually slide over inlet port 21 thereby cutting off a measured or metered amount of liquid from the mass of liquid disposed continuously in syphon 27. In effecting a liquid tight seal a resilient plastic member must coact with a non-resilient member since two rubbing metal surfaces do not form a liquid or gas tight seal.

The valve body of Figs. 2, 3, 4 and 5 is provided below screw threads 13 with a first depending portion having a rim or bulge 28 connected to an integral depending portion of lesser diameter located below bulge 28. The plastic tube 27 being resilient is slipped over bulge or rim 28 and thus locked thereto, thereby effecting a channel 29 for passage of liquid within syphon tube 27 into orifice 21.

The assembled plunger 15 including spring 25 is disposed in the well cavity of the valve body (Figs. 2 to 5) and it is secured therein by a gasket sealer ring 30 coacting with turned over apertured dome 31 formed by the suitable inward movement of a cylindrical wall (Fig. 4) or by means of a metal ring 32 disposed on gasket ring 30, said ring 32 being retained by means of peened over lugs 33.

In the operation of the spray valve of the modification of Figs. 2 to 5, the liquid under pressure in container 10 (Fig. 1) fills the reservoir containing spring 25 passing through channel 29 and through orifice 21 (Fig. 2). Spring 25 continuously urges plunger 15 upward thereby effecting a gas tight seal between plunger ledge 18 and gasket sealer ring 30.

Inward movement of plunger 15 causes transverse conduit 17 to descend below the gas-tightly sealed gasket ring 30 thereby permitting the reservoir liquid to escape through conduit 16 into a finger plate 34 having a lateral narrow bored conduit 35 adapted to direct a fine spray of volatilized perfumed solvent.

The movement of transverse conduit 17 relative to cut-off of inlet orifice 21 by sealing ring 23 (or rings 26) is such that the metered reservoir liquid content is under the pressure exerted by the low boiling liquid disposed within container 10, until all of this metered amount is forced out of the well cavity and into conduit 17 by the vaporization of propellant within the cavity plus its pressure of the incoming liquid in orifice 21, as said orifice is being gradually closed by the sliding of sealing ring 23 thereover. The liquid in the well cavity of valve body 14 passes through conduit 19 and 20, thence between the plunger 15 and the surfaces of the well cavity and finally into conduits 17 and 16 (Fig. 3) and thence to conduit 35 (Fig. 1).

In the modification shown in Figs. 6, 7 and 8 the bottom section of the plunger is solid and the reservoir is disposed laterally relative the bottom section of plunger 15, said reservoir being formed in part by a wall formed from means disposed between the plunger bottom section and the said valve body wall.

In Fig. 6 the bottom section of the plunger 15 is formed with an annular bulbous terminus 36. In this modification the valve body 14 is provided with a first depending cylindrical chamber adapted to receive gasket sealer ring 30x, and a second cylindrical chamber of larger diameter formed by body wall 37. In this modification the syphon tube 27 is provided with an inner diameter slightly less than the diameter of the annular bulbous terminus so that a liquid tight seal is formed slidably therebetween. The bottom of the valve body 14 of this modification (Fig. 6) is flared inwardly thereby forming a reservoir between the exterior surface of syphon 27 and wall 37. The syphon tube 27 is provided with an orifice 38 adapted to lead into the said reservoir and the syphon tube is pushed through the second chamber of valve body 14 and into the first chamber until it is disposed against gasket 30x.

Turning to Fig. 7 there is shown a modification valve body compared to that of Fig. 6, but the plungers 15 of both these modifications are identical and the valves operate under the same principle. In lieu of the gasket 30x and a co-acting portion of syphon tube 27 as shown in Fig. 6, the modification of Fig. 7 employs a tubular insert 39 of rubber or plastic. The insert 39 has an I-shaped cross-section the stem of which is provided with an orifice 40. The insert 39 is held in a depending chamber of the valve body 14 by a flanged rim 41 forming a reservoir between the I-stem wall and the wall 42 forming the depending chamber. In this modification the insert 39 is provided with a sealer ledge 43 adapted to engage ledge 18 of plunger 15. The syphon tube is forced into the tubular channel of the insert 39 below orifice 40.

The valve of Figs. 6 and 7 is assembled by placing the gasket ring 30x and insert 39 respectively in the appropriate valve body 14 and the plunger is then inserted into the valve body so that its top plunger section protrudes above the top valve body surface 44.

A coil spring 45 is placed around the top plunger section and a conventional retaining ring 46 is press fitted into a groove provided in the plunger. A resilient cushion 47 ring is inserted upon the plunger over retaining ring 46 and finger plate 34 is press fitted thereon.

In the operation of the modified spray dispenser of Figs. 6 and 7, the plunger is pushed into the valve body against the pressure of spring 45 until conduit 17 passes beyond gasket 30x or ledge 43 of insert 39. Meanwhile the annular bulbous terminus has gradually cut-off orifice 38 or 40 permitting the measured reservoir contents to be forced out into conduit 16 and thence out of conduit 35 as a fine spray.

The bottom section of the plunger of Figs. 6 and 7 need not be bulbous for it may be modified as shown in Fig. 8. In this case the bottom section of the plunger is of lesser diameter than that of syphon tube 27 (Fig. 6) or the inner tubular wall of insert 39 (Fig. 7) but a resilient sealer ring of round 48 or rectangular 49 cross-section is provided in a suitable circular groove near the plunger end.

Where sealer rings are employed, both the plunger 15 and co-acting valve surface of the valve body 14 may be made of rigid material such as brass, glass, etc. The ring 48 being in such instance pressed out of shape to assume a liquid tight rectangular cross-section.

Having thus described my invention and a plurality of modifications to show its generic scope, other apparent and non-inventive modifications will now become obvious to those skilled in the art, but all these obvious modifications are intended to be embraced within the scope of the claims herein.

I claim:

1. A metering spray valve comprising a valve housing having a longitudinal cylindrical reservoir metering cavity therein having a lateral valve port in spaced relationship to the bottom of said valve body; a unitary longitudinal plunger disposed in said cavity having a top tubular section having a side opening communicating with the tube thereof integral with a bottom longitudinal section having a longitudinal bore hole having a relatively enlarged top segment having a horizontally disposed bore hole therein which communicates with the longitudinal borehole of said bottom plunger section, said top segment being in spaced relationship to the cavity bottom wall; a resilient sealer ring disposed in an air tight manner within the top portion of the cavity of said housing and about said top plunger section continuously seizing said top plunger section in a gas tight manner and adapted to seat against said plunger segment in a gas tight manner; resilient means disposed exteriorly about said bottom plunger section for slidingly seizing said cavity wall in a gas tight manner and for opening and closing said lateral housing valve port prior to communicative engagement of the side opening of said tube of said top section with said reservoir cavity; spring means disposed within said reservoir cavity and beneath said plunger for continuously urging said plunger upwardly and out of contact with said housing lateral port, whereby downward movement of said plunger shuts off said housing lateral port from communicating with said reservoir prior to establishing communication between the side opening of the tube of said top plunger section and the metering cavity disposed below said sealer ring.

2. The spray valve of claim 1 comprising a syphon tube disposed about and secured to the bottom of said housing and in space relationship to said housing lateral valve port whereby propellant fluid disposed in said syphon tube communicates through the space between said bottom of said housing and the syphon tube wall to effect communication with said housing lateral valve port.

3. The apparatus of claim 2 wherein said resilient means disposed about said bottom plunger section is a unitary rubber sleeve.

References Cited in the file of this patent

UNITED STATES PATENTS

| 2,667,991 | Boyer | Feb. 2, 1954 |
| 2,686,652 | Carlson | Aug. 17, 1954 |
| 2,693,983 | Howell | Nov. 9, 1954 |
| 2,701,163 | Teller | Feb. 1, 1955 |
| 2,746,796 | St. Germain | May 22, 1956 |